INVENTORS
Alexander H. Callander, Morey L. Lampson, Joseph E. Nitsche 3,293,014
**METHOD AND APPARATUS FOR MANU-
FACTURING GLASS BEADS**
Alexander H. Callander, Dundee, and Morey L. Lampson and Joseph E. Nitsche, Corning, N.Y., assignors to Corning Glass Works, Corning, N.Y., a corporation of New York
Filed Nov. 18, 1963, Ser. No. 324,286
7 Claims. (Cl. 65—21)

The present invention relates to the production of glass beads and more particularly to a method of producing glass beads directly from a molten stream of glass, but is in no way limited thereto.

One prior art method for the production of glass beads involves the initial manufacture of glass and the subsequent cooling thereof. The cooled glass, referred to as cullet, is then crushed and screened to the approximate size of the resultant glass beads desired. The screened material is then fed into an apparatus wherein a flame traveling upward at low velocity carries the glass particles and causes them to become spheralized while traveling with the flame. The spheralized particles are subsequently collected in suitable troughs or the like adjacent the top or exhaust end of the tower of the apparatus. An example of such apparatus is shown in U.S. Patents, Numbers 2,619,776 and 2,730,841, to R. H. Potters and C. E. Searight respectively.

The disadvantage of such prior art process is that it is uneconomical for large volume production in that the glass which has been reduced to a molten state is cooled to a solid state and after being pulverized is then reheated to a molten state in order to spheralize the pulverized material. The consequent loss of efficiency through two separate and distinct heating steps is obvious. Another disadvantage is that the glass, being a highly abrasive material, is exceedingly detrimental to the customary crushing and similar equipment used for its size reduction consequently, both the equipment and the maintenance thereof is expensive and the maintenance is time consuming. A still further disadvantage of such a method is that a large quantity of glass which was originally melted is lost during pulverization in the form of dust too fine to be used in the process.

Another method for producing glass beads comprises dropping crushed glass particles through an electric arc wherein the particles become molten and consequently spheralized. An example of such a process is shown in U.S. Patent No. 2,859,560 to J. R. Wald, Jr. et al.

This method, having all the disadvantages hereinabove noted, has the additional disadvantage of being uneconomical as a result of employing electric heat only in the spheralizing process.

A further prior art method teaches causing a molten stream of glass to fall forcefully upon a cold contacting surface whereupon the glass is dispersed into droplets. A stream of air is directed at the point of contact of such stream on said surface to assist in dispersing said stream and to remove the droplets therefrom. Such a method is taught in U.S. Patent 2,965,921 to C. C. Bland.

Such a method has the disadvantage of producing a high percentage of fibers and irregularly shaped droplets resulting in a poor quality product.

A still further prior art process provides for flowing a stream of molten glass into a high velocity carrier gas stream substantially transverse to said stream of molten glass whereupon the glass is caused to disperse. The carrier gas stream is surrounded by a plurality of burners which provide products of combustion at a temperature above the melting point of the glass. The dispersed glass is then separated from the stream and is subsequently cooled and collected. Such a method is taught in British Patent No. 844,573.

Among the disadvantages of such a process is that the zone maintained above the melting temperature of said glass, within which the dispersed particles of glass are spheralized, is too short resulting in an exceptionally high percentage of fibers, elongated beads and in an otherwise poor quality product. The temperature of the combustion products from the high velocity burners cannot be maintained above the melting temperature of the glass for any significant distance from the burners. Further, since the stream of molten glass is relatively small it quickly cools after it leaves the orifice of the body of molten glass, and for many glass compositions the temperature and viscosity of the stream at the point of dispersion is such that much of the glass is dispersed in the form of fibers rather than beads.

Other methods of producing glass beads such as by employing a field of ultrasonic waves, or by introducing a vertical blast flame into a body of molten glass, or the like are also known however, such other methods also have disadvantages such as those listed above.

It is an object of this invention to provide a method and apparatus for forming glass beads which overcomes the heretofore noted disadvantages.

Another object of this invention is to provide a method and apparatus for forming glass beads wherein the glass beads are formed directly from a molten stream of glass.

Still another object of this invention is to provide a method and apparatus for fabricating small glass beads efficiently and economically.

A further object is to provide a method and apparatus to form glass beads directly from a molten stream of glass wherein the percentage of glass fibers in the product is maintained at a minimum.

A still further object of this invention is to provide a method and apparatus for tempering the glass beads as part of the forming process.

In accordance with this invention, the method in its broader aspect comprises providing a first stream of suitably conditioned molten glass, providing a second stream of high velocity gas substantially transverse to the path of said first stream at a temperature sufficient to maintain said glass at a viscosity below about 500 poises, flowing said first stream of conditioned molten glass into said second stream thereby dispersing said first stream and causing the dispersed glass to be carried along by said second stream, feeding low pressure raw gas into said second stream to maintain the temperature of said second stream at a temperature sufficient to maintain said glass at a viscosity below about 500 poises while said dispersed glass is carried by said second stream whereby said dispersed glass spheralizes and forms glass beads, separating said glass beads from said second stream, cooling said beads at a predetermined rate, and collecting the cooled beads.

Additional objects, features, and advantages of the present invention will become apparent, to those skilled in the art, from the following detailed description and the attached drawings, on which, by way of example, only the preferred embodiments of the invention are illustrated.

Figure 1:
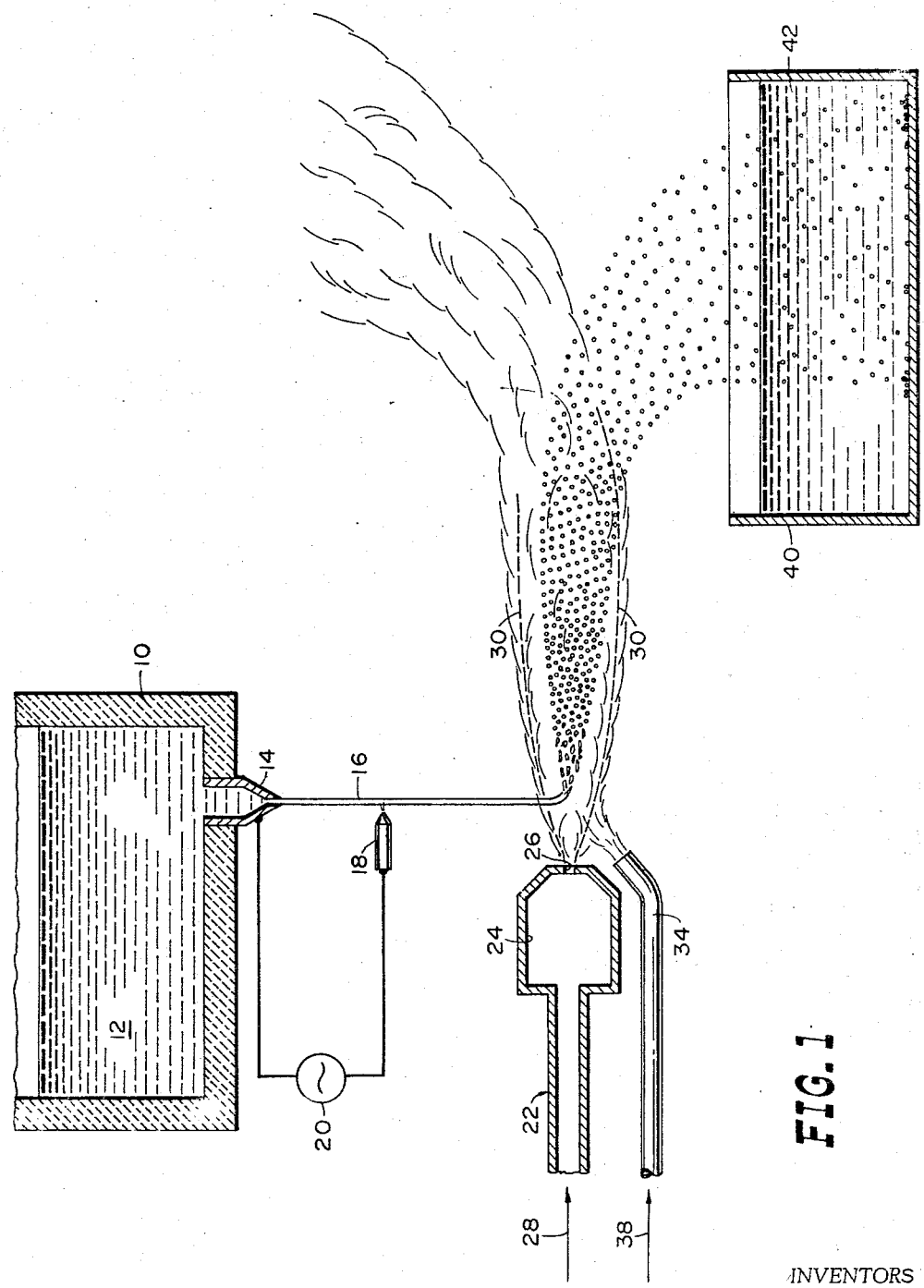
FIGURE 1 is a diagrammatic illustration of an apparatus suitable for carrying out the method of this invention.

Referring to FIGURE 1, the apparatus illustrated comprises a glass tank 10 for maintaining a body or reservoir of molten glass 12 therein. Molten glass 12 flows from tank 10 through orifice 14 forming stream 16. It is understood that orifice 14 is formed of an electrically conductive material, such as metal or the like. Electrode 18 is disposed below and spaced from orifice 14 adjacent stream 16. A suitable electrical energy source 20 is connected to orifice 14 and electrode 18. Electrode 18 is not in contact with stream 16, however, an electrical circuit is completed through said stream by means of an arc between electrode 18 and stream 16.

In the manufacture of glass beads, stream 16 of necessity must have a comparatively small diameter, for example less than about 3/8 inch, consequently, the molten glass of said stream quickly cools off after it leaves orifice 14. By passing regulated amounts of electrical energy through a portion of stream 16 between electrode 18 and orifice 14, the temperature of stream 16 may be carefully regulated and the stream suitably conditioned for subsequent dispersal. The hereinabove described conditioning is necessary for most glass compositions since the temperature of the body of molten glass itself cannot, as a practical matter, be raised sufficiently due to the physical limitations of the tank materials.

It has been found, however, that certain low viscosity and low melting temperature glasses may be suitably conditioned by controlling the temperature of molten glass 12 within tank 10. This type of conditioning is possible with glass compositions which do not require a temperature of the body of molten glass 12 in excess of the physical limitations of the tank materials to have a suitable stream temperature and viscosity at the point of dispersion.

It should be noted that without proper conditioning, that is maintaining stream 16 at a suitable temperature and viscosity at the point of dispersion, an exceptionally high percentage of fibers rather than beads are formed.

Referring again to FIGURE 1, a burner generally indicated by the numeral 22 having a combustion chamber 24 and an orifice 26, is disposed below electrode 18. A gaseous fuel-air mixture is fed to said burner, as indicated by arrow 28, from a suitable source not shown. The gaseous fuel, hereinafter referred to as raw gas, may be any of the common commercial gaseous fuels such as natural gas, manufactured gas, water gas, or the like. The raw gas-air mixture is caused to burn within combustion chamber 24 and the gaseous products of combustion thereof are emitted through orifice 26 forming a high velocity gas stream which in turn forms a glass spheralizing zone indicated by dotted lines 30. As the hereinabove described suitably conditioned molten glass stream 16 enters the spheralizing zone, it is dispersed by said high velocity stream. The term "high velocity stream," as used herein, is defined as a stream having a velocity in excess of about 40 feet per second.

Figure 2:
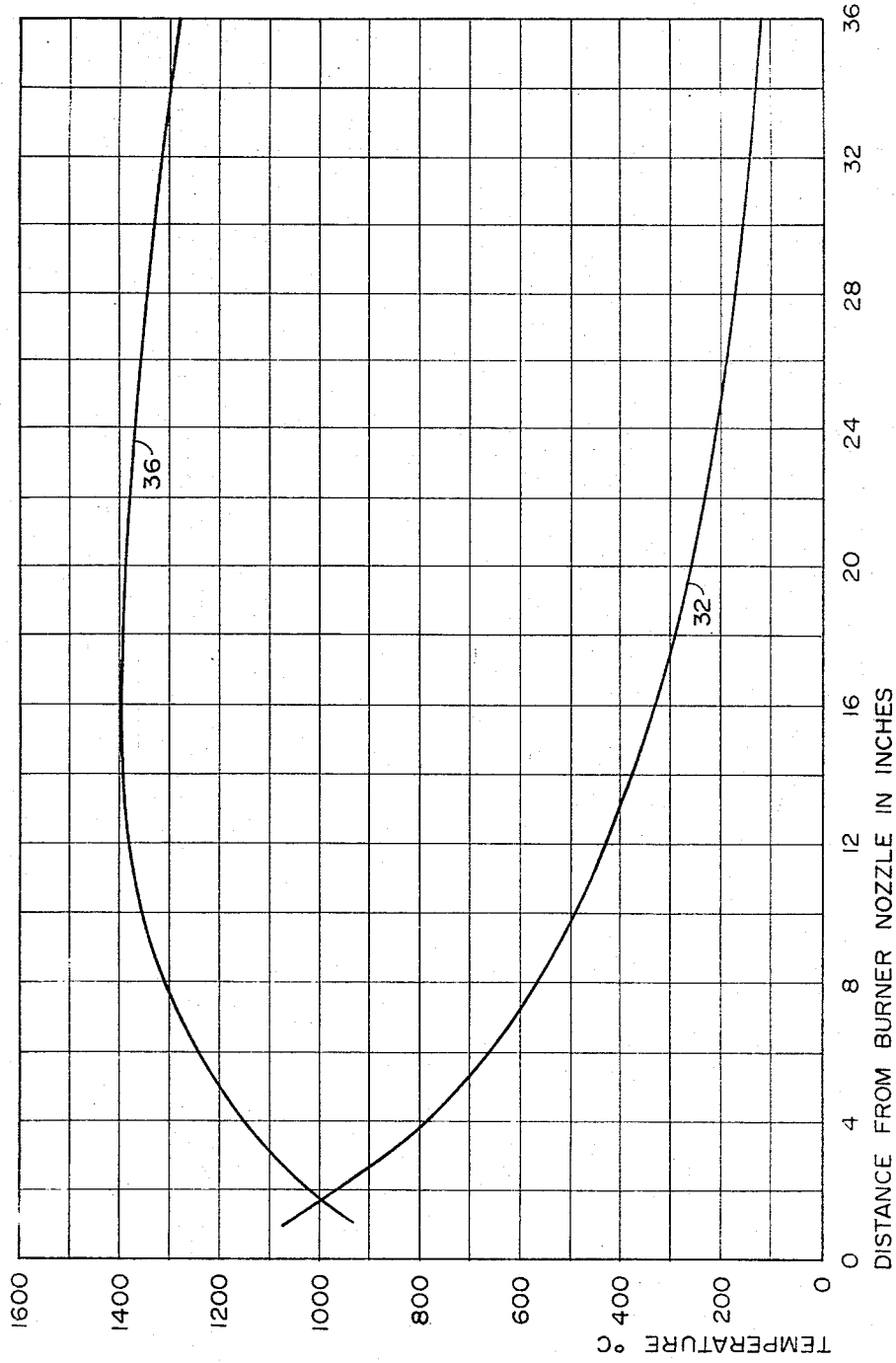
FIGURE 2 is a graph of the temperature within the spheralizing zone as a function of the distance from the burner nozzle along the center line thereof.

Referring additionally to FIGURE 2 it is seen that the temperature of said high velocity stream, only a short distance from the burner nozzle, is less than that necessary to maintain the viscosity of most glasses below about 500 poises. Line 32 illustrates a typical temperature distribution of the products of combustion emitted from burner 22 as a function of the distance from said nozzle. Accordingly, as molten glass stream 16 is dispersed by the high velocity stream, some glass beads are formed in that portion of the spheralizing zone wherein the temperature is sufficient to maintain the glass viscosity below about 500 poises, however a large amount of glass fibers are formed in the balance of said zone and some are formed in said portion of said zone.

It is believed that large amounts of surrounding air are sucked into said high velocity stream at the root thereof adjacent the exterior of orifice 26, thereby bringing about a rapid drop in temperature of said zone only a short distance from said orifice. It has been found that by flowing low pressure raw gas directly at said high velocity stream by means of nozzle 34, said raw gas is caused to burn with the air being sucked into said high velocity stream, as well as the surrounding air, causing the temperature distribution of the spheralizing zone to be as illustrated by typical temperature distribution line 36 of FIGURE 2. Said raw gas is fed to said nozzle, as indicated by arrow 38, from a suitable source not shown. It is readily seen that the temperature illustrated by line 36 is higher than that necessary to maintain the viscosity of most glasses below about 500 poises. Accordingly, glass beads are caused to form not only at one end of said spheralizing zone but throughout it. Any fibers which may be formed at the beginning of said zone are caused to break up and coagulate thereby forming beads as they are being carried along by said high velocity stream. This fiber break-up and coagulation is not possible without feeding raw gas into said spheralizing zone as heretofore described, because the temperature of said zone would be below that necessary to maintain said glass at a suitable viscosity.

The glass beads so formed are separated from said high velocity stream by gravity and are caused to fall into a suitable collecting tank 40. By disposing fluid medium 42 within tank 40, said glass beads may be tempered as they are collected in said tank. Suitable fluid tempering mediums are water, oils and like liquids.

The method and apparatus of this invention are suitable for forming glass beads of any desired glass composition and one familiar with the glass art may readily select a suitable glass. The amount of electrical energy passed through the molten glass stream, if any, will depend upon the composition of the glass as well as the size of the glass beads desired. The type of fluid for tempering the glass beads will depend upon the rate of cooling desired and consequently the strength of the beads, as well as on the composition and size of the glass beads. One familiar with the art can readily determine the amount of electrical energy required and the proper type of tempering fluid to use.

A typical example of carrying out the instant invention is illustrated by the following description with reference to FIGURES 1 and 2. A body of molten glass 12, having a temperature of about 1400° C., was disposed in a glass tank having a 1/8 inch diameter orifice. Said glass was of a composition as illustrated by Example 6 of U.S. Patent No. 2,527,693 to W. H. Armistead. A stream of molten glass having a temperature of approximately 1175° C. was flowed into a substantially horizontal high velocity stream having a velocity ranging from about 250 to 350 feet per second. Said high velocity stream was produced by burning a natural gas-air mixture, having a gas-air ratio of approximately 1:10, at a rate of approximately 2000 cubic feet per hour, in burner 22. Said natural gas had a heat content of approximately 1000 B.t.u. per cubic foot. Electrode 18 was spaced about midway between orifice 14 and burner 22. Raw gas of the same type as used in burner 22 was fed through nozzle 34 at the rate of approximately 1100 cubic feet per hour creating a spheralizing zone of approximately 36 inches in length with a temperature distribution substantially as illustrated by line 36 of FIGURE 2. About 2500 watts of electric energy was caused to pass through molten stream 16 between electrode 18 and orifice 14. The fluid tempering medium was water. With glass flowing at the rate of approximately 25 pounds per hour, glass beads having compressive strengths of up to approximately 400,000 pounds per square inch were produced in sizes ranging from approximately 8 to approximately 40 U.S. Standard mesh size, with less than 2 percent of the total being glass fibers.

Another example of carrying out the instant invention is illustrated by the following. A body of molten low viscosity soda lime glass 12, having a temperature of about 1425° C., was disposed in glass tank having a 3/32 inch diameter orifice. A stream of molten glass having a temperature of approximately 1235° C. and a viscosity of approximately 50 poises was flowed into a substantially horizontal high velocity stream having a velocity ranging from about 250 to about 350 feet per second. Said high velocity stream was produced by burning a natural gas-air mixture, having a gas-air ratio of approximately 1:10, at a rate of approximately 1650 cubic feet per hour, in burner 22. Burner 22 was disposed about 4 inches below orifice 14. Said natural gas had a heat content of approximately 1000 B.t.u. per cubic foot. Raw gas of the same type as used in burner 22 was fed through nozzle 34 at the rate of approximately 1000 cubic feet per hour creating a spheralizing zone of approximately 36 inches in length. The fluid tempering medium was water. With glass flowing at the rate of approximately 17 pounds per hour, glass beads having compressive strengths of up to approximately 400,000 pounds per square inch were produced in sizes ranging from approximately 8 to approximately 40 U.S. Standard mesh size, with less than 2 percent of the total being glass fibers.

It will be appreciated by those skilled in the art that the size of the resultant glass beads by the described method and apparatus are dependent on a number of variable factors. These factors include the viscosity of the glass, the composition of the glass, the diameter of orifice 14, the amount of electrical energy passed through stream 16, the velocity of the combustion products in the spheralizing zone, the amount of raw gas fed into said zone, and other factors. It is readily seen that a plurality of the streams may issue from tank 10 thereby increasing the productivity of the apparatus.

Although the present invention has been described with respect to specific details of certain embodiments thereof it is not intended that such details be limitations on the scope of the invention except insofar as set forth in the following claims.

We claim:

1. A method of producing glass beads comprising the steps of
   providing a first stream of molten glass,
   providing a second stream of high velocity gas substantially transverse to the path of said first stream at a temperature sufficient to maintain said glass at a viscosity below about 500 poises, the high velocity gas stream forming a spheralizing zone,
   flowing said first stream of molten glass into said second stream thereby dispersing said first stream and causing the dispersed glass to be carried along by said second stream, and
   feeding raw gas fuel into substantially the beginning of said spheralizing zone for combustion therewithin, whereby said dispersed glass spheralizes and forms glass beads.

2. The method of claim 1 further comprising the step of heating said first stream of molten glass before flowing it into said second stream.

3. The method of claim 2 wherein said molten glass is heated by passing an electric current through said first stream.

4. The method of claim 1 further comprising the steps of
   separating said beads from said second stream,
   cooling said beads at a predetermined rate, and
   collecting the cooled beads, whereby said beads are formed to a substantially spherical shape, substantially free from fibers, and suitably tempered.

5. An apparatus for forming glass beads comprising
   molten glass supply means for supplying a stream of molten glass,
   an electrically conductive orifice through which said stream of molten glass passes,
   an electrode disposed below said orifice and spaced from said stream of molten glass to form an electric arc therebetween,
   means for providing electrical energy connected to said orifice and said electrode, whereby an electric circuit is completed through said stream of molten glass by said arc thereby adding heat to said stream of molten glass,
   means for providing a high velocity gas stream along a path substantially transverse to the path of the heated stream of molten glass whereby said stream of molten glass is dispersed and carried by said high velocity gas stream upon impingement thereof by said gas stream, said high velocity gas stream forming a spheralizing zone, and
   means for feeding raw fuel gas into substantially the beginning of said spheralizing zone for combustion therewithin, whereby the dispersed glass is spheralized and forms glass beads.

6. The apparatus of claim 5 wherein said means for providing a high velocity gas stream comprise a gas burner.

7. The apparatus of claim 5 further comprising
   means for separating said glass beads from said gas stream,
   means for cooling said glass beads at a predetermined rate, and
   means for collecting the cooled beads.

References Cited by the Examiner

UNITED STATES PATENTS

| | | | |
|---|---|---|---|
| 848,422 | 3/1907 | Wynne | 219—50 |
| 2,859,560 | 11/1958 | Wald et al. | 65—21 |
| 3,138,444 | 6/1964 | Searight et al. | 65—21 |
| 3,150,947 | 9/1964 | Bland | 65—21 |

DONALL H. SYLVESTER, *Primary Examiner.*

HOWARD R. CAINE, G. R. MYERS,
*Assistant Examiners.*